(12) United States Patent
Khabashesku et al.

(10) Patent No.: US 10,892,070 B2
(45) Date of Patent: Jan. 12, 2021

(54) METHODS OF TREATING CARBON NANOTUBES AND CONDUCTIVE ELEMENTS INCLUDING SUCH CARBON NANOTUBES

(71) Applicant: Baker Hughes Oilfield Operations, LLC, Houston, TX (US)

(72) Inventors: Valery N. Khabashesku, Houston, TX (US); Alexander Moravsky, Tucson, AZ (US); Raouf Loutfy, Tucson, AZ (US); Darryl N. Ventura, Houston, TX (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 0 days.

(21) Appl. No.: 16/265,365

(22) Filed: Feb. 1, 2019

(65) Prior Publication Data
US 2020/0251256 A1    Aug. 6, 2020

(51) Int. Cl.
*H01B 13/00*    (2006.01)
*C01B 32/168*    (2017.01)
(Continued)

(52) U.S. Cl.
CPC ......... *H01B 13/0036* (2013.01); *C01B 32/16* (2017.08); *C01B 32/168* (2017.08); *H01B 1/04* (2013.01); *C01B 2202/22* (2013.01); *C01P 2002/52* (2013.01); *C01P 2004/13* (2013.01); *C01P 2006/10* (2013.01); *C01P 2006/40* (2013.01)

(58) Field of Classification Search
CPC ...................................... H01B 1/04
See application file for complete search history.

(56) References Cited

U.S. PATENT DOCUMENTS 7,501,650 B2    3/2009    Park et al.
8,354,593 B2    1/2013    White et al.
(Continued)

FOREIGN PATENT DOCUMENTS

KR    10-2005-0074519 A    7/2005

OTHER PUBLICATIONS

Panchakarla et al., Nitrogen- and Boron-Doped Double-Walled Carbon Nanotrubes, ACNANO, vol. 1, No. 5, pp. 494-500.
(Continued)

*Primary Examiner* — William D Young
(74) *Attorney, Agent, or Firm* — TraskBritt

(57) ABSTRACT

A method of treating an elongated conductive element comprises exposing a conductive element sequentially to at least two dopants being different in composition. The dopants may include an acidic dopant and a halogen-based dopant. The conductive element comprises a plurality of carbon nanotubes and has a linear density in a range from about 0.1 tex to about 2.0 tex. The method further comprises mechanically densifying the conductive element. The elongated conductive element comprises at least one carbon nanotube fiber doped with a plurality of p-type dopants comprising at least one acidic dopant and at least one halogen-based dopant. The at least one carbon nanotube fiber has an electrical resistivity equal to or less than about 55 μΩ·cm and an ultimate tensile strength equal to or greater than about 1 GPa.

16 Claims, 2 Drawing Sheets

(51) Int. Cl.
*C01B 32/16* (2017.01)
*H01B 1/04* (2006.01)

(56) References Cited

U.S. PATENT DOCUMENTS

| | | |
|---|---|---|
| 8,530,271 B2 | 9/2013 | Virkar et al. |
| 8,808,792 B2 | 8/2014 | Starkovich et al. |
| 9,685,258 B2 | 6/2017 | Silverman et al. |
| 10,128,022 B1 * | 11/2018 | Lyon ................. C25D 5/54 |
| 2010/0243963 A1 | 9/2010 | Zehavi |
| 2011/0110843 A1 | 5/2011 | Pasquali et al. |
| 2014/0138587 A1 | 5/2014 | Pasquali et al. |
| 2014/0314949 A1 | 10/2014 | Starkovich |
| 2014/0363669 A1 * | 12/2014 | Otto ................. C01B 32/168 |
| | | 428/367 |
| 2016/0003016 A1 | 1/2016 | Chang et al. |
| 2017/0148538 A1 | 5/2017 | Nishiura et al. |
| 2017/0186512 A1 | 6/2017 | McFarland et al. |
| 2017/0194074 A1 | 7/2017 | Sohn et al. |
| 2018/0237295 A1 * | 8/2018 | Kumagai ............ C01B 32/16 |
| 2018/0308604 A1 | 10/2018 | Liang et al. |

OTHER PUBLICATIONS

Gorkina et al., Transparent and Conductive Hybrid Graphene/Carbon Nanotube Films, Carbon vol. 100, (2016), pp. 501-507.

\* cited by examiner

METHODS OF TREATING CARBON NANOTUBES AND CONDUCTIVE ELEMENTS INCLUDING SUCH CARBON NANOTUBES

TECHNICAL FIELD

The disclosure, in various embodiments, relates generally to methods of treating conductive elements, such as carbon nanotube assemblies, to improve electrical properties, so as to reduce electrical resistivity, and to improve mechanical properties, such as to increase tensile strength, of the carbon nanotube conductive elements.

BACKGROUND

Oil and other subterranean fluids are typically extracted from geological formations through wellbores extending into subterranean formations. During subterranean drilling and completion operations, various power and/or communication signals may be transmitted through pipe segments or other downhole components, e.g., via a "wired pipe" configuration. Such configurations include electrical, optical or other conductors extending along the length of selected pipe segments. The conductors are operably connected between pipe segments by a variety of coupling configurations, and are typically connected to a surface system using a surface communication sub or other interface on the uppermost pipe with a cable connection to the surface system.

Power cables may be extensive in length in order to extend between the surface system and the downhole components. Utilization of conventional metals such as copper and silver for electrical power conductors such as for wire, cabling, etc. for power transmission may be problematic for such large-scale applications. For instance, while copper and silver exhibit high electrical conductivities, they exhibit high material densities and undesirable mechanical properties such as low tensile and fatigue strengths. Accordingly, copper wiring increases the weight of the system while being subject to failure due to the low tensile and fatigue strengths of the wire. Further, the downhole equipment may be subject to corrosive, high temperature (e.g., 150-200° C.), and high pressure environments that may result in premature failure of the power cables. Thus, there is a need for materials having electrical and mechanical properties comparable to or exceeding the electrical and mechanical properties of copper and silver.

Carbon nanotubes (CNTs) present a potential suitable alternative to conventional electrically conductive metals. CNTs exhibit low material densities, tunable (e.g., adjustable) electrical properties, and high mechanical performance, such as high tensile strengths and fatigue strengths. CNTs may also be highly resistant to fatigue, radiation damage, and heat and may be suitable for use in downhole environments. Accordingly, CNTs exhibit useful electrical and mechanical properties for applications as a substitute for copper and silver in power cables.

BRIEF SUMMARY

In some embodiments, a method of treating a conductive element comprises exposing a conductive element sequentially to at least one acidic dopant and to at least one halogen-based dopant. The conductive element comprises a plurality of carbon nanotubes and has an initial linear density in a range from about 0.1 tex to about 2.0 tex.

In further embodiments, a method of treating a conductive element comprises exposing a conductive element sequentially to at least two dopants. Each dopant of the at least two dopants being different in composition, and the conductive element comprising a plurality of carbon nanotubes. The method further comprises mechanically densifying the conductive element.

In yet further embodiments, an elongated conductive element comprises at least one carbon nanotube fiber doped with a plurality of p-type dopants. The plurality of p-type dopants comprises at least one acidic dopant and at least one halogen-based dopant. The at least one carbon nanotube fiber has an electrical resistivity equal to or less than about 55 $\mu\Omega\cdot$cm and an ultimate tensile strength equal to or greater than about 1 GPa.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular system or component thereof, but are merely idealized representations which are employed to describe embodiments of the present disclosure.

As used herein, the term "substantially" in reference to a given parameter, property, or condition means and includes to a degree that one of ordinary skill in the art would understand that the given parameter, property, or condition is met with a degree of variance, such as within acceptable manufacturing or measurement tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

Figure 1:
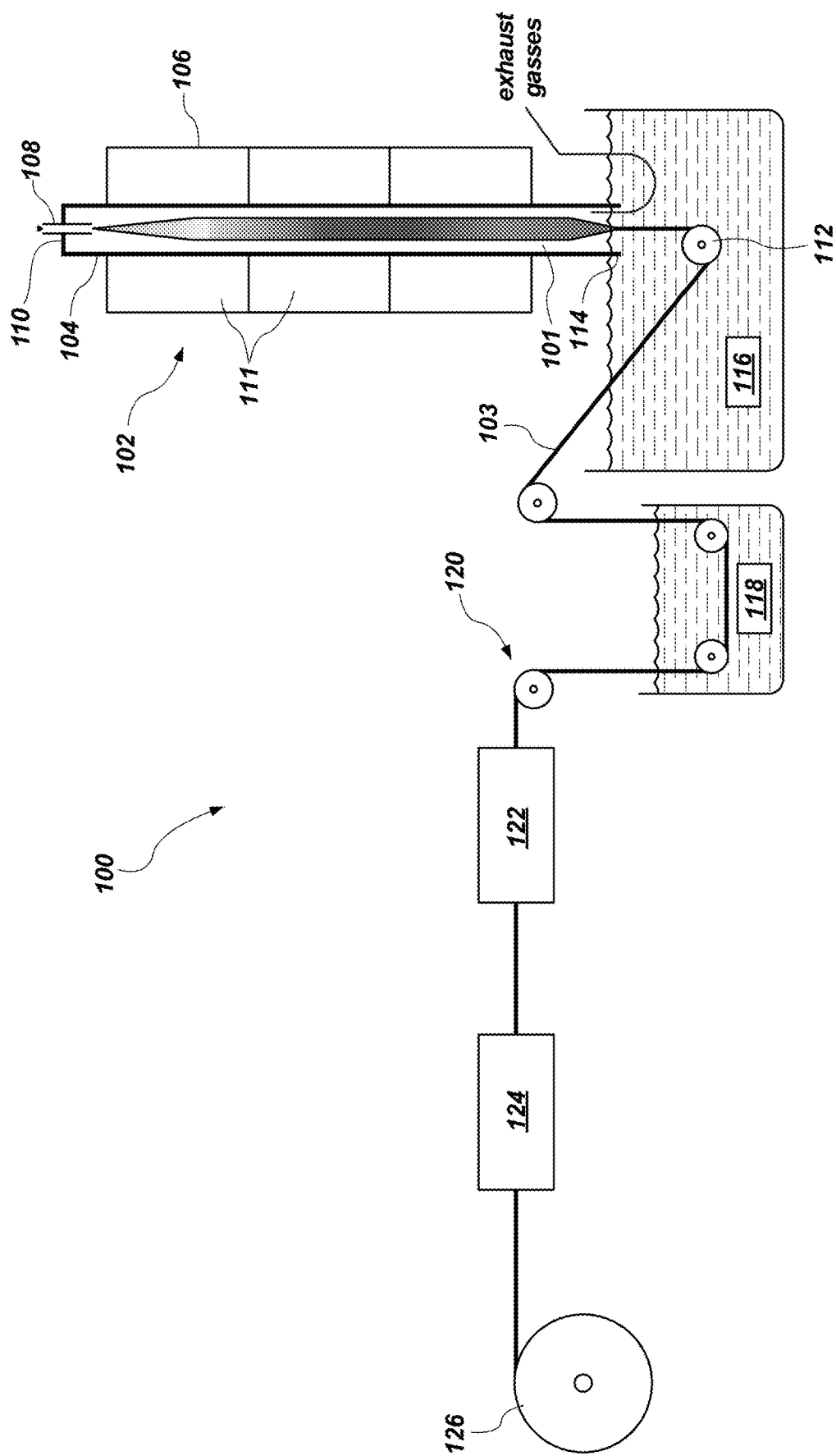
FIG. 1 is a schematic illustration of a system according to embodiments of the disclosure.

FIG. 1 is a schematic illustration of a system 100 for producing (e.g., manufacturing, forming) an electrically conductive element. In embodiments of the disclosure, the system 100 produces an electrically conductive element comprised of carbon nanotubes (CNTs). The system 100 comprises a reactor 102 configured for growing (e.g., synthesizing) CNTs 101 in a chemical vapor deposition (CVD) process. The reactor 102 comprises a reaction tube 104, a heater 106 disposed around the reaction tube 104, and an injector 108 for introducing one or more chemical reactants for synthesizing CNTs 101 into the reaction tube 104. The injector 108 may be disposed at a first end 110 of the reaction tube 104. In some embodiments, at least a portion of the injector 108 may be disposed within the reaction tube 104 such that the chemical reactants are introduced into a heated portion of the reaction tube 104. The system 100 further includes a first collection roller 112 disposed at a second end 114 of the reaction tube 104. In operation, the first collection roller 112 removes a conductive element comprised of CNTs 101 out of the reaction tube 104 and converts the CNTs 101 into a CNT fiber 103 by a direct spinning process.

The reaction tube 104 may have a length extending in a range from about 1.5 feet to about 10 feet measured from the first end 110 to the second end 114. Increasing the length of the reaction tube 104 correspondingly increases the length of the CNTs 101 synthesized within the reaction tube 104 and, accordingly, increases a mass of the CNT fiber 103 produced by the system 100. The system 100 of the disclosure is configured to produce a continuous CNT fiber 103 having a length extending in a range from about 1 km to about 10 km such as a length of about 1.5 km or about 5 km. Increasing the length of the CNTs 101 synthesized within the reaction tube 104 increases the electrical conductivity and the ultimate tensile strength of the CNT fiber 103.

The heater 106 may be configured to generate a thermal gradient (e.g., thermal profile) between the first end 110 and the second end 114 of the reaction tube 104. In some embodiments, the heater 106 comprises a plurality of heating zones 111. In such embodiments, each heating zone 111 is set to a selective temperature such that the temperature within the reaction tube 104 increases to a maximum temperature and subsequently decreases in temperature between the first end 110 and the second end 114 is established in the reaction tube 104. A temperature of the heating zones 111 may extend in a range extending from about 1100° C. to about 1500° C., from about 1150° C. to about 1450° C., or from about 1150° C. to about 1350° C. In some embodiments, the reactor 102 includes five heating zones 111. In such embodiments, the respective heating zones 111 between the first end 110 and the second end 114 of the reaction tube 104 may be heated to 1000° C., 1100° C., 1350° C., 1350° C., and 1050° C., respectively, for example. Increasing the maximum temperature of the reaction tube 104 has been found to increase the electrical conductivity of the CNTs 101 formed therein. By way of example and not limitation, increasing the maximum temperature of the reaction tube 104 from 1250° C. to 1350° C. was determined in experimentation to increase both the electrical conductivity and the ultimate tensile strength (UTS) of the CNT fiber 103 by 100% (e.g., the electrical conductivity and the UTS were each doubled).

The injector 108 may comprise a nebulizer configured to generate a spray (e.g., mist) of the chemical reactants and introduce the chemical reactants spray directly into a heated portion of the reaction tube 104. The injector 108 is configured to introduce a continuous (e.g., unpulsed) spray of the chemical reactants into the reaction tube 104.

In some embodiments, the first collection roller 112 may be disposed (e.g., immersed) in a water tank 116 such that the CNT fiber 103 is formed in a wet spinning process. In other embodiments, the first collection roller 112 may be disposed over the water tank 116 such that the CNT fiber 103 may be formed in a dry spinning process.

The system 100 may comprise an acetone tank 118. A plurality of rollers 120 may be provided to transfer the CNT fiber 103 from the first collection roller 112 to the second rollers 120 such that the CNT fiber 103 passes from the water tank 116 and through the acetone tank 118. The system 100 may further comprise a doping system 122 and a densification system 124. While the doping system 122 is illustrated as preceding the densification system 124 in FIG. 1, the system 100 is not so limited. In some embodiments, the densification system 124 may precede the doping system 122 in the process sequence. In other embodiments, the doping system 122 and the densification system 124 may be combined.

The doping system 122 may comprise at least one doping device configured to dope the CNT fiber 103. In some embodiments, the doping device may comprise a heated gas reaction tube for exposing the CNT fiber 103 to a gaseous dopant. In other embodiments, the doping device may comprise a tank or other vessel for exposing the CNT fiber 103 to an aqueous dopant solution contained in the vessel.

The densification system 124 comprises at least one densification device configured to decrease a linear density and increase a volume density of the CNT fiber 103. In some embodiments, the densification device may comprise one or more (e.g., a pair) of pressurized rollers. The rollers may be configured to apply an axial shearing force on the CNT fiber 103. In other embodiments, the densification device may comprise one or more rollers configured to strain (e.g., stretch, elongate) the CNT fiber 103 as the CNT fiber 103 passes between consecutive (e.g., adjacent) rollers. In yet further embodiments, the densification device may comprise a false-twisting device. The system 100 further comprises a second collection roller 126 for collecting the doped and/or densified CNT fiber 103 thereabout.

Figure 2:
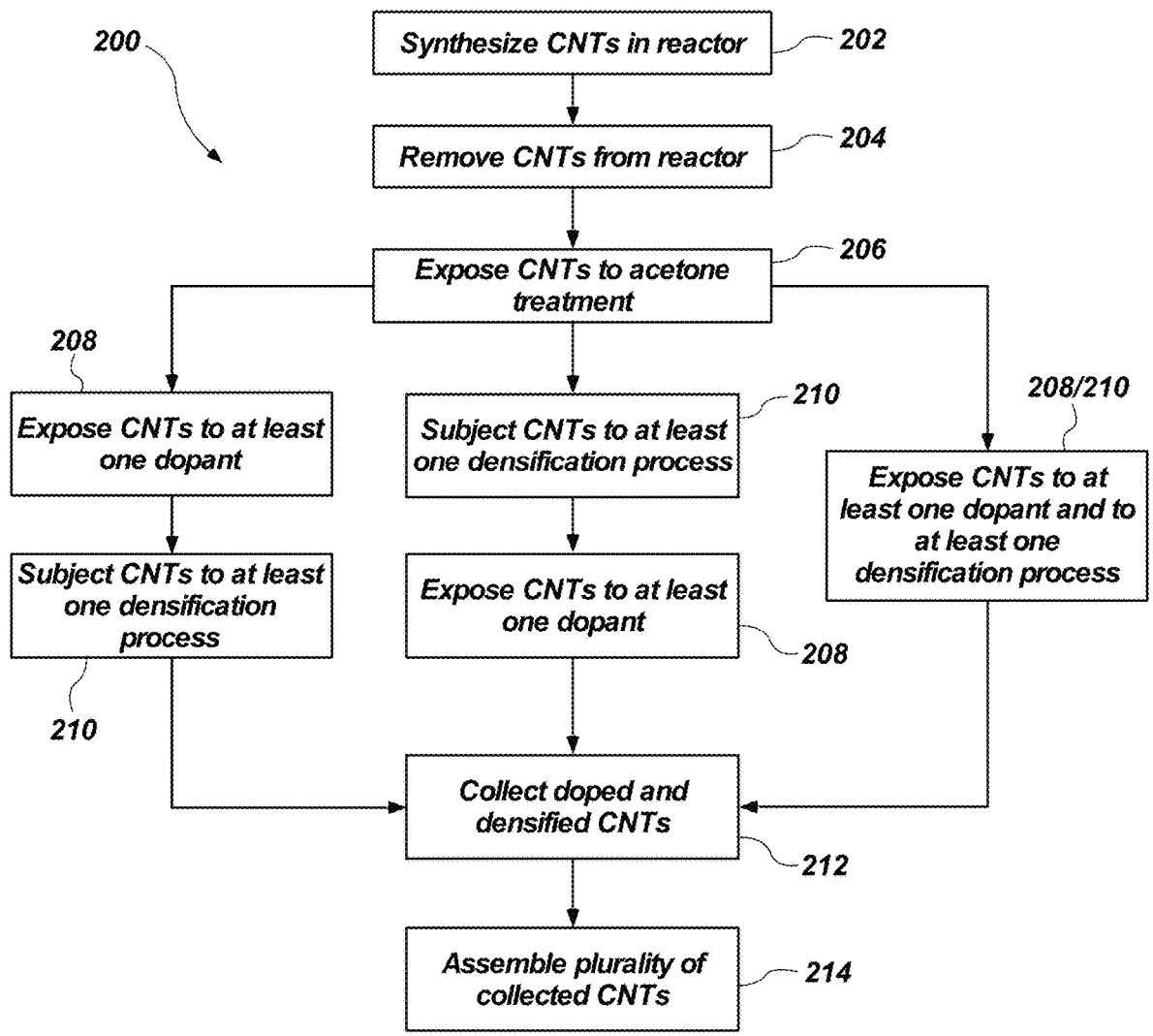
FIG. 2 is a process flowchart for a method of forming and treating electrically conductive elements using the system of FIG. 1 according to embodiments of the disclosure.

FIG. 2 is a process flow chart illustrating actions performed by a method of forming and treating a conductive element comprised of CNTs. With continued reference to FIGS. 1 and 2, in action 202 of the flow chart 200, CNTs 101 may be formed (e.g., grown, synthesized) in the reactor 102. In particular, the CNTs 101 may be formed by a CVD process. The CNTs 101 may comprise thin-walled carbon nanotubes (TWCNTs) such as single-walled carbon nanotubes (SWCNTs), double-walled carbon nanotubes (DWCNTs), multi-walled carbon nanotubes (MWCNTs), or a combination thereof.

To form the CNTs 101, a reaction mixture comprising an iron source and a carbon source may be provided in the reaction tube 104 by the injector 108. A mixture of the iron source and the carbon source may be sprayed into a heated portion with the injector 108. In some embodiments, the iron source comprises a solution of ferrocene and thiophene, and the carbon source comprises at least one of ethanol, ethylene, acetylene, or methane. A carrier gas, such as a hydrogen ($H_2$) rich gas, flows through the reaction tube 104 to carry the iron source and the carbon source therethrough. As the iron source and the carbon source flow through the reaction tube 104, iron particles form and react with hydrocarbons from the carrier gas and the carbon source to form CNTs 101. The CNTs 101 assemble into a hollow cylindrical structure, which may be referred to in the art as a "sock." The carrier gas continues to flow and transfers the CNTs 101 to the second end 114 of the reaction tube 104.

One or more parameters of the system 100 including, but not limited to, the temperature of the heater 106, the composition of the reaction mixture, the rate at which the injector 108 provides the reaction mixture within the reaction tube 104, the length of the reaction tube 104, and the collection speed of the first collection roller 112, may be tailored (e.g., adjusted) to produce a CNT fiber 103 having a desired linear density, electrical resistivity, diameter, and composition.

In action 204, the sock comprised of the CNTs 101 is drawn out of the reaction tube 104 and converted into a CNT fiber 103 by collection on (e.g., winding about) the first collection roller 112 in a direct spinning process. During action 204, at least a portion of the carrier gas flowing through the sock is removed by compressing the CNT fiber 103 on the first collection roller 112. In some embodiments, the CNT fiber 103 may be formed by a wet spinning process. In such embodiments, the first collection roller 112 is submerged in the water tank 116. In other embodiments, the CNT fiber 103 may be formed by a dry spinning process. In such embodiments, the first collection roller 112 is disposed above the water tank 116. The water tank 116 may further be provided proximate to the second end 114 of the reaction tube 104 to capture exhaust gases from the reaction tube 104.

The rate at which the first collection roller 112 rotates to form the CNT fiber 103 (e.g., the collection rate) may be controlled to produce a CNT fiber 103 of a desired linear density. In some embodiments, the first collection roller 112 may be rotated at a linear speed of about 5 m/min, of about 10 m/min, or in a range from about 5 m/min and about 10 m/min. The CNT fiber 103 removed from the reaction tube 104 and wound about the first collection roller 112 has an initial linear density in a range from about 0.1 g/km (tex) to about 6 tex, or from about 0.1 tex to 2 tex. As used herein, the term "initial linear density" refers to the linear density of the CNT fiber 103 wound about the first collection roller 112 after the CNT fiber 103 has been removed from the reaction tube 104.

The CNT fiber 103 is subjected to at least one treatment configured to increase a volume density and decrease a linear density of the CNT fiber 103, to decrease the electrical resistivity and, correspondingly, to increase the electrical conductivity of the CNT fiber 103, to increase the tensile strength of the CNT fiber 103, and/or to increase the axial alignment of the CNT fiber 103. In particular, the CNT fibers 103 may be treated such that a weight-specific electrical conductivity, or electrical conductivity per unit of density, and/or tensile strength of the CNT fiber 103 are substantially equal to or greater than those of copper. According to embodiments of the disclosure, the CNT fibers 103 may be treated such that the CNT fibers 103 exhibit an electrical resistivity equal to or less than about 55 μΩ·cm and an ultimate tensile strength equal to or greater than about 1 GPa.

For instance, the CNT fiber 103 may be subjected to an acetone treatment in action 206. In action 206, the CNT fiber 103 is immersed in and transferred through the acetone tank 118 with the plurality of rollers 120. In some embodiments, the CNT fiber 103 may be mechanically and/or chemically densified as the CNT fiber 103 is subjected to the acetone treatment. In such embodiments, immersion in acetone may result in a chemical densification of the CNT fiber 103. Further, the rollers 120 disposed in the acetone tank 118 may mechanically densify the CNT fiber 103. In some embodiments, the rollers 120 may comprise a false-twisting device such that the CNT fiber 103 is twisted as the CNT fiber 103 is transferred through the acetone tank 118. In other embodiments, the rollers 120 may strain the CNT fiber 103 as the CNT fiber 103 is transferred through the acetone tank 118. As the CNT fiber 103 is removed from the acetone tank 118, the CNT fiber 103 may be dried to remove excess acetone.

In action 208, the CNT fiber 103 may be exposed to at least one dopant. The CNT fiber 103 may be subjected to at least one densification process in action 210. In some embodiments, action 208 may occur prior to action 210 such that the CNT fiber 103 is doped and subsequently densified. In other embodiments, action 210 may occur prior to action 208 such that the CNT fiber 103 is densified and subsequently doped. In yet further embodiment, action 208 and action 210 may be concurrent such that the CNT fiber 103 is substantially simultaneously doped and densified.

The dopant(s) of action 208 may be selected to decrease the electrical resistivity and, therefore, increase the electrical conductivity of the CNT fiber 103. As used herein, "dopant" means and includes an element or compound used to dope a target structure to alter (e.g., modify) one or more properties of the target structure including, but not limited to, electrical properties thermal properties, and mechanical properties. The dopant may be deposited or otherwise formed on the target structure in a gaseous phase, vapor phase, a liquid phase (e.g., solution), or a combination thereof. As used herein, dopant may refer either to the substance, such as a vapor or bath, including element or compound used to dope the target structure or to the element or compound itself. The dopant may comprise a p-type (e.g., hole type) dopant. In some embodiments, the dopant may comprise a halogen-based dopant. By way of non-limiting example, the halogen-based dopant may comprise halogens such as bromine ($Br_2$), chlorine ($Cl_2$), and iodine ($I_2$), interhalogens such as iodine trichloride ($ICl_3$), iodine bromide (IBr), and bromine chloride (e.g., BrCl), and other halogen-based compounds such as iron chloride (e.g., $FeCl_3$). In other embodiments, the dopant may comprise an acidic dopant such as a super acid, or an acid having a Hammett acidity function equal to or greater than −12. By way of non-limiting example, the acidic dopant may comprise a chlorosulfonic acid ($HSO_3Cl$), a nitric acid ($HNO_3$), and/or a sulfuric acid such as oleum (20-30% $SO_3 \cdot H_2SO_4$).

In some embodiments, the dopant may be an aqueous dopant. In such embodiments, a vessel of the aqueous dopant may be provided such that the CNT fiber 103 may be immersed in the aqueous dopant as the CNT fiber 103 is transferred through the vessel. In other embodiments, the dopant may be a gaseous dopant. In such embodiments, the CNT fiber 103 may be disposed in a heated gas reaction tube and exposed to the gaseous dopant.

In further embodiments, the CNT fiber 103 may be exposed to more than one (e.g., two, three, four, or more) dopants. In action 208, the CNT fiber 103 is exposed sequentially to at least two dopants having different compositions. The CNT fiber 103 may be exposed to a combination of gaseous and aqueous dopants. The CNT fiber 103 may be exposed sequentially to at least one acidic dopant and to at least one halogen-based dopant. For instance, the CNT fiber 103 may be immersed in an aqueous solution of chlorosulfonic acid, nitric acid, or oleum to dope the CNT fiber 103. The doped CNT fiber 103 may be dried to remove excess solution. In some embodiments, excess solution may be removed by a wash comprising one of more of ether, acetone, and water, and/or by exposure to heat (e.g., evaporation). Subsequently, the CNT fiber 103 may further be doped with the gaseous dopant.

The densification process of action 210 may comprise a mechanical densification process and/or a chemical densification process. The densification process may be configured to irreversibly compress the CNT fiber 103 such that a thickness of the CNT fiber 103 is reduced, a volume density of the CNT fiber 103 is increased, a linear density of the CNT fiber 103 is decreased, and/or alignment within the CNT fiber 103 is increased. Alternatively or additionally, the densification process may be configured to irreversibly elongate the CNT fiber 103 such that a length of the CNT fiber 103 is increased, a volume density of the CNT fiber 103 is increased, a linear density of the CNT fiber 103 is decreased, and/or alignment within the CNT fiber 103 is increased. In some embodiments, exposing the CNT fiber 103 to one or more of the foregoing dopants may result in a chemical densification of the CNT fiber. In such embodiments, the densification process of action 210 and the doping process of action 208 are substantially simultaneous. In a mechanical densification process, the CNT fiber 103 may be subject to a rolling process. The CNT fiber 103 passes through an opening between two opposing rollers configured to apply an axial shearing force on the CNT fiber 103. In some embodiments, the CNT fiber 103 may be transferred through a series of opposing rollers. By way of non-limiting example, the densification system 124 may comprise between 1 and 12 pairs of rollers. A force may be applied to the respective rollers to apply on a predetermined amount of force on the CNT fiber 103 as it passes through the opposing rollers. In some embodiments, the force applied to the roller may be in a range extending from about 0.5 kg to about 2 kg and may be about 0.5 kg, 1 kg, or 2 kg. In other embodiments, the CNT fiber 103 passes through a pair of rollers configured to apply a twisting force on the CNT fiber 103 as the CNT fiber 103 passes therethrough. In such embodiments, the rollers may comprise a false-twisting device, which comprises a pair of rollers that rotate in opposite directions while moving laterally with respect to each other such that the CNT fiber 103 is twisted and untwisted periodically. The CNT fiber 103 may be twisted at a twist rate extending in a range from about 0.1 twist/mm to about 5 twists/mm or from about 0.1 twist/mm to about 2 twists/mm, such as about 0.3 twist/mm, 1.5 twist/mm, 2 twists/mm, or 2.3 twists/mm. In yet further embodiments, the CNT fiber 103 may be strained as the CNT fiber 103 passes between rollers.

In some embodiments, the CNT fiber 103 is mechanically densified while the CNT fiber 103 is exposed to the one or more dopants. For example, the CNT fiber 103 may be strained, compressed, axially sheared, and/or twisted while the CNT fiber 103 is immersed in the solution of the acidic dopant.

In action 212, the doped and/or densified CNT fiber 103 may be collected on the second collection roller 126. In action 214, a plurality of doped and/or densified (e.g., treated) CNT fibers 103 may be assembled to form a conductive element of any desirable form. A predetermined number of CNT fibers 103 having a linear density in a range extending from about 1 tex to about 20 tex or in a range of about 1 tex to about 10 tex may be assembled together to form a conductive element having a desired linear density. In some embodiments, the conductive element may be selected to have a linear density of between about 50 tex and about 200 tex, such as a linear density of about 96 tex, about 100 tex, and about 130 tex. By way of non-limiting example, CNT fibers 103 may be combined to form CNT assembly such as a yarn, tape, ribbon, film, cable, wire, rope, thread, etc. The CNT fibers 103 may be combined by braiding, twisting, weaving, and the like. The conductive element comprising a plurality of CNT fibers 103 exhibits the electrical and mechanical properties of the individual CNT fibers 103.

In experiments, a fiber comprising DWCNTs was formed in accordance with a method as described herein. The fiber was synthesized in the reaction tube 104 having a maximum temperature of 1350° C. and was removed from the reaction tube 104 on the first collection roller 112 at a linear collection rate of 10 m/min. The fiber exhibited a low linear density of 0.09 tex. The fiber was densified by passing the fiber through 9 pairs of rollers, each roller having 1 kg of weight applied thereon. The fiber was subsequently exposed to one or more dopants to measure the effect of the dopant(s) on the electrical properties and, particularly, the electrical resistivity of the fiber and to measure the effect of the dopant(s) on the mechanical properties and, particularly, the UTS of the fiber.

Working Example 1

The low linear density fiber was doped with BrCl gas for a period of 0.25 hours at 200° C. Doping and densifying the fiber reduced the resistivity by a factor of about 2.6 and increased the UTS by a factor of about 1.4 compared to an as-formed (e.g., undoped and not densified) fiber. The doped and densified fiber exhibited a resistivity of about 55 μΩ·cm, and UTS of about 950 MPa.

Working Example 2

The low linear density fiber was doped with $FeCl_3$ gas for a period of 1 hour at 360° C. Doping and densifying the fiber reduced the resistivity by a factor of about 2.6 and increased the UTS by a factor of about 1.7 compared to an as-formed fiber. The doped and densified fiber exhibited a resistivity of about 55 μΩ·cm, and UTS of about 1.3 GPa.

Working Example 3

The low linear density fiber was doped with BrCl gas at 200° C. for a period of 15 minutes and subsequently doped with $FeCl_3$ gas at 360° C. for a period of 1 hour. Compared to the doped and densified fiber of Working Example 1, the additional $FeCl_3$ doping had a negligible effect on the electrical resistivity of the fiber. Doping and densifying the fiber reduced the resistivity by a factor of about 3 compared to an as-formed fiber. The doped and densified fiber exhibited a resistivity of about 45.9 μΩ·cm and UTS of about 1.2 GPa.

Working Example 4

The low linear density fiber was doped with $FeCl_3$ gas at 360° C. for a period of 1 hour and subsequently with BrCl gas at 200° C. for a period of 30 minutes. Compared to the doped and densified fiber of Working Example 2, the additional BrCl doping after FeCl$_3$ had a greater effect on electrical resistivity and on UTS than either dopant had individually. The hybrid doping and densification of the fiber reduced the resistivity by a factor of about 4.3 and increased the UTS by a factor of about 2 compared to an as-formed fiber. The doped and densified fiber exhibited a resistivity of about 27.3 µΩ·cm, and a UTS of about 1.6 GPa.

Working Example 5

The low linear density fiber was consecutively doped with an oleum solution, doped with FeCl$_3$ gas for a period of 1 hour at 360° C., and doped with BrCl gas for a period of 30 minutes at 200° C. Compared to the doped and densified fiber of Working Example 4, the additional oleum doping had a greater effect on electrical resistivity than FeCl$_3$ and BrCl. Doping with oleum alone reduced the resistivity by a factor of about 1.2 to about 120 µΩ·cm compared to the as-formed fiber. The additional doping with FeCl$_3$ and BrCl further reduced the resistivity by a factor of about 4.0 and increased the UTS by a factor of about 2 compared to the oleum doped fiber. The oleum-FeCl$_3$—BrCl doped and densified fiber exhibited a resistivity of about 31 µΩ·cm, and a UTS of about 1.4 GPa.

In view of the foregoing examples, treating conductive elements including CNTs in a hybrid doping process, or a process including two or more dopants, results in a greater reduction of the electrical resistivity of the CNTs than a doping process including a single dopant. Accordingly, the electrical properties of the CNTs may be tailored such that the weight-specific electrical conductivity of the CNT fiber, which may be about 0.02 MS·cm$^2$/g for 31 µΩ·cm in the CNT fiber according to Working Example 5, is competitive with the specific electrical conductivity of copper metal (about 0.066 MS·cm$^2$/g). Thus, CNTs formed and treated according to methods of the disclosure are suitable for use as electrical power conductor cables with a conductance competitive with copper wire or cables and having mechanical and materials properties such as tensile strength and density superior to copper wire or cables.

While the disclosed structures and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A method of treating an elongated conductive element, comprising:
   exposing a conductive element sequentially to at least one acidic dopant and to at least one halogen-based dopant comprising bromine chloride, the conductive element comprising a plurality of carbon nanotubes, the conductive element having an initial linear density in a range from about 0.1 tex to about 2.0 tex.

2. The method of claim 1, wherein each of the at least one acidic dopant and the at least one halogen-based dopant comprises a p-type dopant.

3. The method of claim 1, wherein the at least one acidic dopant comprises one of oleum, chlorosulfonic acid, or nitric acid.

4. The method of claim 1, wherein exposing the conductive element sequentially to at least one acidic dopant and at least one halogen based-dopant comprises exposing the conductive element sequentially to oleum, iron trichloride, and bromine chloride in that order.

5. The method of claim 1, wherein exposing the conductive element sequentially to at least one acidic dopant and at least one halogen based-dopant comprises exposing the conductive element sequentially to nitric acid, iron trichloride, and bromine chloride in that order.

6. The method of claim 1, wherein exposing the conductive element sequentially to at least one acidic dopant and at least one halogen based-dopant comprises exposing the conductive element sequentially to chlorosulfonic acid, iron trichloride, and bromine chloride in that order.

7. The method of claim 1, further comprising densifying the conductive element.

8. The method of claim 7, wherein densifying the conductive element comprises straining the conductive element as the conductive element is exposed to the at least one acidic dopant.

9. The method of claim 7, wherein densifying the conductive element comprises at least one of straining, axially shearing, or twisting the conductive element.

10. The method of claim 1, further comprising synthesizing the carbon nanotubes of the conductive element in a chemical vapor deposition process.

11. The method of claim 10, wherein synthesizing the carbon nanotubes comprises growing carbon nanotubes in a reaction chamber at a temperature extending in a range from about 1000° C. to about 1450° C.

12. The method of claim 11, further comprising removing the carbon nanotubes formed in the reaction chamber by a direct spinning process.

13. The method of claim 12, wherein the carbon nanotubes are removed from the reaction chamber at a linear collection speed of about 10 m/min.

14. A method of treating a conductive element, comprising:
   exposing a conductive element sequentially to at least two dopants, each dopant of the at least two dopants being different in composition and at least one of the at least two dopants comprising bromine chloride, the conductive element comprising a plurality of carbon nanotubes; and
   mechanically densifying the conductive element.

15. The method of claim 14, wherein mechanically densifying the conductive element comprises one of straining, twisting, or compressing the conductive element.

16. The method of claim 14, wherein the conductive element is mechanically densified while the conductive element is exposed to a first dopant or a second dopant of the at least two dopants.

* * * * *